Dec. 2, 1941.  T. O. DAYWALT ET AL  2,265,065
LOW FRICTION BEARING
Filed Aug. 21, 1940  2 Sheets-Sheet 2
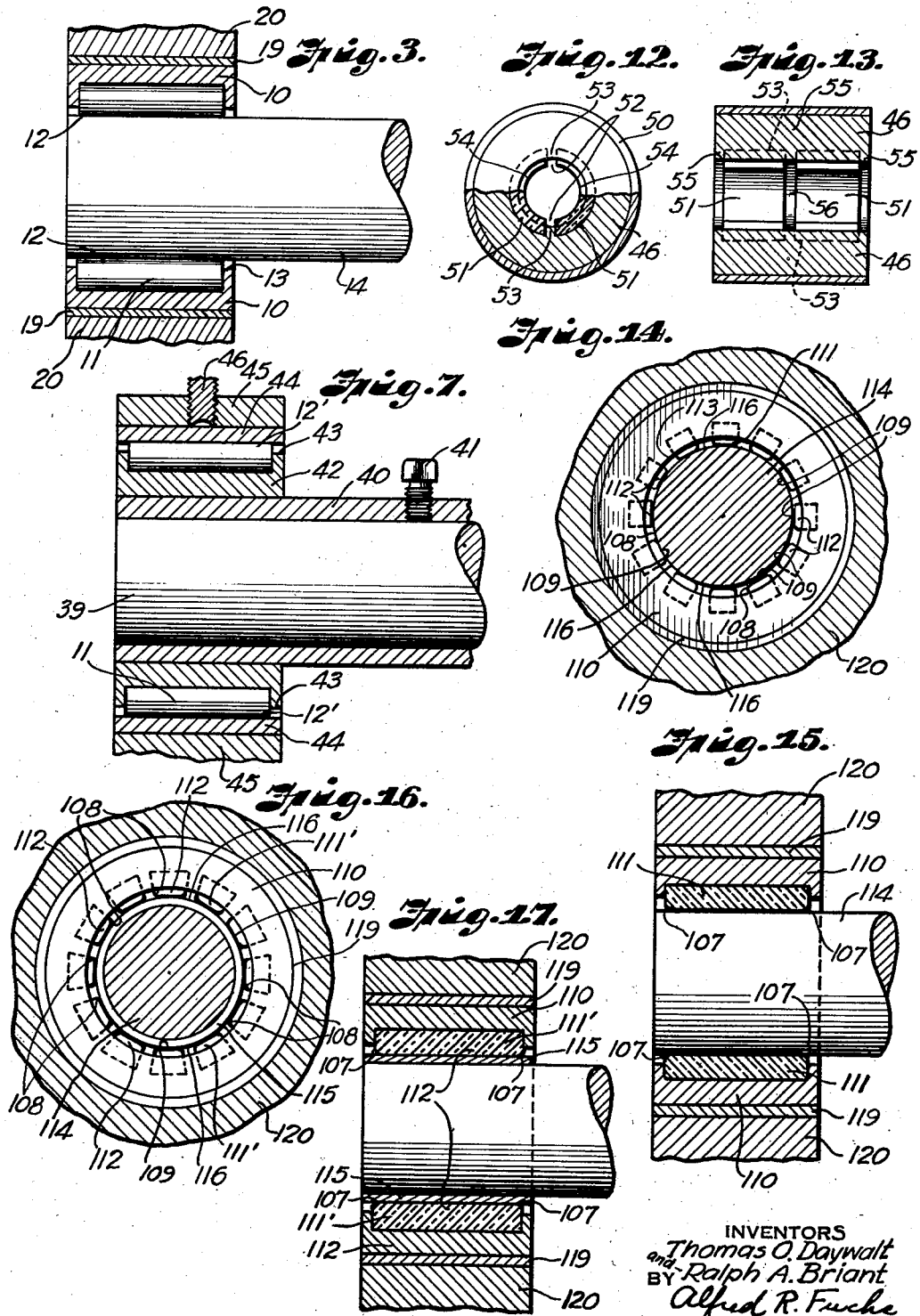
INVENTORS
Thomas O. Daywalt
and Ralph A. Briant
BY Alfred R. Fuchs
ATTORNEY Patented Dec. 2, 1941

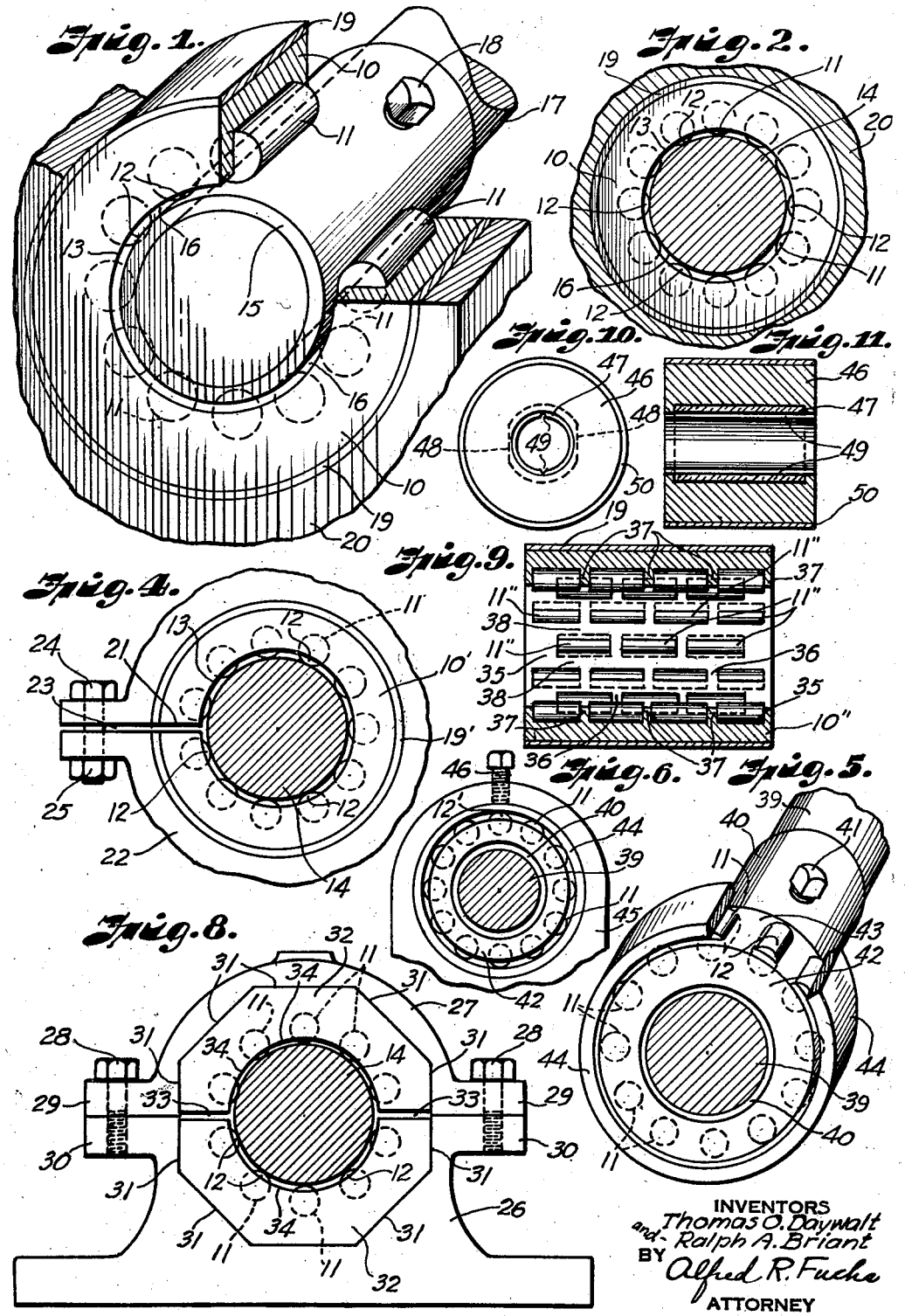

2,265,065

UNITED STATES PATENT OFFICE 2,265,065

LOW FRICTION BEARING

Thomas O. Daywalt, Wichita, Kans., and Ralph A. Briant, Kansas City, Mo., assignors of one-third to Weaver M. Briant, North Kansas City, Mo., and one-third to Willa W. Daywalt, by decree of court, and one-third to said Ralph A. Briant Application August 21, 1940, Serial No. 353,522

17 Claims. (Cl. 308—238)

Our invention relates to bearings, and more particularly to a bearing that has a very low coefficient of friction.

Glass is very desirable for use in bearings, because of its having a very low coefficient of friction, and also because of its lightness. Glass has very high compressive strength, although it does not have any great amount of flexibility or tensile strength. While various recognized authorities differ as to the crushing strength of glass, these authorities giving such strength as from three to twenty-seven tons per square inch, it is probable that the difference in opinion as to the compressive strength of glass is due to the method of supporting glass in tests, as well as to the type of glass used. Of recent years, heat resistant glasses have been developed, that have higher crushing strength than the previously known glasses, and also greater tensile strength, and have many other advantages over the older kinds of glass. It is, however, highly desirable in making a bearing that has a glass bearing surface, that the glass be so mounted that it is only subjected to compression, and it is one of the purposes of our invention to provide a bearing comprising glass forming the bearing surface, that is so mounted that the same is only put under compression.

One of the difficulties in the use of glass bearings is that glass has a much lower coefficient of expansion than steel, and consequently when the shaft expands, the bearing must absorb the expansion by deflection, in the types of bearings previously known that utilized glass at the bearing surface. In our invention, this expansion is taken care of by inlaying, or molding, or otherwise embedding, the glass forming the bearing surface in a plastic body, which has more flexibility than the glass, the body made of a molded plastic material serving as a support for the glass of the bearing to absorb the expansion and shock. In the preferred form of the invention a series of glass contact pieces, or bearing members, are arranged in an annular series around the inside circumference of the bearing and embedded in a body of more flexible material, the spaces between the contact pieces, or bearing members, forming grooves for distribution of lubricant, the contact members, or bearing members, being fixed against rotation, or movement relative to the body in which the same are embedded. In certain bearings of small diameter, the glass contact member, or bearing member, is made of a tubular, or sleeve-like character, and is embedded in a mounting of a flexible character, by molding the same in a plastic material, or some other similar material. It is important that the material in which the glass bearing portion, or portions, are mounted, has a lower molding temperature than the melting point of the glass and is of a somewhat resilient, or flexible, character, so that any deflection, or other adjustment, due to expansion of the metal parts, with which the glass parts engage, will be absorbed in this mounting material.

It is a further purpose of our invention to provide a bearing of the above mentioned character, that does not require any finishing, such as grinding or polishing, commercial glass rod or bar stock being used in making up a bearing of the character referred to above, having the annular series of contact or bearing members.

The above referred to ability of our bearing to take care of and absorb shaft expansion, refers to expansion in a radial direction relative to the axis of rotation of the shaft. Because of slight variations in the surface of the shaft with which our improved bearings are used, it is also desirable to provide a certain amount of flexibility in the bearing, axially or lengthwise of the shaft, this being accomplished by providing a plurality of axially aligned spaced glass contact, or bearing, members in the annular series, the adjacent contact, or bearing, members in the annular series being, preferably, staggered relative to each other. Thus the mounting of the glass contact members will take care of any slight undulations in the shaft surface, or other irregularities, that may exist, which cannot be taken care of by the glass itself.

It is, of course, to be understood that in bearings made in accordance with our invention, we can take advantage of the very high compressive strength of glass, by inlaying it or molding it in the supporting material, which is, preferably, a molded plastic, and which has a much higher tensile strength than glass. The glass is thus completely supported so that it does not have any except compression stresses exerted thereon. The corrugated effect produced by the arrangement of the glass and the molded body of plastic material in which the same is mounted, provides a means of cooling the bearing by distributing grease or oil through the multiplicity of grooves thus provided, in which bearings the grooves would, of course, run only axially, but in the longer bearing, made as above referred to, there would be both radial, or circumferential, and axial grooves, the radial, or circumferential, grooves being provided by the spaces between the sections of glass rod, or bar, it being obvious that there would be small gaps between the ends of these rod, or bar-like, members, that would connect with the axial grooves.

While an annular series of rod-like glass bearing, or contact, members is referred to above as being on the inner surface of the bearing projecting from the resilient molded body member, it is obvious that the reverse arrangement with the glass contact, or bearing, members, arranged in an annular series projecting slightly from the outer circumferential surface of the molded body portion, can also be utilized where this may be found desirable.

Other objects and advantages of our invention will appear as the description of the drawings proceeds. We desire to have it understood, however, that we do not intend to limit ourselves to the particular details shown or described, except as defined in the claims.

In the drawings:

Fig. 1 is a perspective view, partly broken away, of one form of our improved bearing.

Fig. 2 is a view partly in transverse section and partly in elevation, of a slight modification.

Fig. 3 is a longitudinal sectional view of the bearing shown in Fig. 2, partly broken away.

Fig. 4 is a view partly in elevation and partly in section, of a bearing similar to that shown in Figs. 1 and 2, but split at one point for adjustment purposes, and partly broken away.

Fig. 5 is a perspective view, partly broken away, of a modified form of our bearing, in which the glass contact members project from the outer surface of the body portion.

Fig. 6 is a view partly in transverse section and partly in elevation, showing the bearing of the form shown in Fig. 5.

Fig. 7 is a longitudinal sectional view of the bearing shown in Figs. 5 and 6, partly broken away.

Fig. 8 is a view through the bearing employing our invention, made up of separable pillow block and cap members.

Fig. 9 is a longitudinal sectional view through a further modified form of bearing.

Fig. 10 is a view in end elevation, of a still further modified form of bearing.

Fig. 11 is a longitudinal sectional view through the bearing shown in Fig. 10.

Fig. 12 is an end view partly broken away, showing a further modified form of bearing.

Fig. 13 is a longitudinal section of the bearing shown in Fig. 12.

Fig. 14 is a view partly in transverse section and partly in elevation, of another form of bearing, partly broken away.

Fig. 15 is a longitudinal sectional view through the bearing shown in Fig. 14, partly broken away.

Fig. 16 is a view similar to Fig. 14, of a further modification, and

Fig. 17 is a longitudinal sectional view through the bearing shown in Fig. 16, partly broken away.

Referring in detail to the drawings, in Figs. 1, 2 and 3 is shown a bearing comprising a body portion 10, in which glass bearing members 11 are inlaid. The body portion 10 is, preferably, molded out of plastic material, such as a phenolic condensation product, although other materials may be used that have the required tensile strength and flexibility and which have a molding temperature lower than the melting point of glass, so that the body portion can be molded around the glass so as to embed the glass rod-like members 11 therein solidly in fixed position. The material must be of such character that the same conforms to the shape of the outer surface of the rod-like, or cylindrical, glass members 11, so that these will be solidly supported thereby and will not be flexed due to pressure exerted thereon, the same being supported throughout their length by the material in which these are embedded. While, of course, the glass bearing members 11 could be embedded in a metallic mounting, this would be an expensive bearing, because of the fact that grooves would have to be milled out, of the exact size and shape of the bearing members, or contact members, 11 so as to seat these firmly in the grooves when put in position, and in such case it would be necessary to cement the members 11 in position, so as to prevent any rotation thereof and to make it absolutely certain that these are firmly seated throughout their length in the grooves. Molding is preferred, because this is much cheaper and a plastic material can be readily obtained, of such specifications that it will have the required molding temperature and the required strength, and said rod-like bearing members can be inlaid in the molded body portion 10, with the molded body portion extending beyond the ends of said rod-like members to fix these against endwise movement, as will be evident from Figs. 1 and 3.

The glass bearing members 11 are arranged in an annular series with their centers spaced a uniform distance from the axial center of the bearing and are, preferably, uniformly spaced from each other annularly, the same having portions 12 that project slightly beyond the inner cylindrical surface 13 of the molded body portion 10, so as to contact the rotatable means, such as the shaft 14, shown in Figs. 2 and 3, or the cylindrical or sleeve-like member 15 shown in Fig. 1, and to provide grooves between said members 11 and the shaft, or sleeve-like member, such as indicated at 16, which can serve as pockets for lubricant, such as oil or grease. Of course, the sleeve-like member 15 is mounted on a shaft 17, similar to the shaft 14, and may be provided with means, such as the set screw 18, for holding the same in fixed position on the shaft.

The body portion 10 is provided with an annular shell 19 of metal, surrounding the same, to take up any stresses to which the bearing may be subjected and to prevent damage to the molded body portion 10 in handling. Said bearing is, of course, mounted in a suitable bearing socket in a surrounding member 20, of any suitable character, that may be provided in the machine, or other mechanism, having the shaft that is to be provided with the bearing of our invention. The bearing members, or contact members, 11 are, preferably, made of a tempered heat resisting glass, which is of much greater strength than ordinary glass, and also has the heat resisting properties that would be desirable in a bearing of this character. While lubricant grooves are provided, it is possible to operate a bearing of this character without the use of lubricant in many instances, and it is one of the advantages of utilizing the glass rod-like members that these will have a tendency to be cooled, due to their spaced arrangement and due to the fact that the same are made of heat resisting glass, even if these do become heated up to some extent, the same will not be damaged. Furthermore, due to the small amount of contact surface and the relatively large volume of each of the rod-like members compared to its contacting portion, the heating effect of friction will be minimized. It is obvious that the bearing members 11 will be entirely under compression and that glass members of the character set forth will have great compressive strength. Also due to the provision of a large number of separate rod-like members of relatively small diameter, if any defect should develop in any one of the rod-like members, such as a crack, no serious damage will be done to the bearing and it can continue to be used, as it will not progress through the entire bearing.

While a bearing of an annular character, with no break therein, is shown in Figs. 1 and 2, obviously other forms of bearings can be made in a similar manner. Thus in Fig. 4 a bearing is shown, which has a body portion 10', which is the same as the body portion 10, except for the fact that it has a gap, or split, 21 therein, the bearing members 11 being mounted in the same manner in the body portion 10' as in the body portion 10, and a split shell, or outer ring-like member, 19' being provided, instead of the annular member 19 shown in Figs. 1 and 2. Such a bearing member is, of course, to be utilized in a bearing socket, such as shown in Fig. 4, in which a split annular body portion 22 is provided, which has a gap 23 therein providing for adjustment of the bearing, the adjustment being obtained by means of a bolt 24 and nut 25. It will be obvious that as the material of the molded body portion 10' is of a somewhat flexible or resilient character, the bearing can be adjusted to the shaft 14 by adjustment of the bolt and nut 24 and 25 to draw the bearing or contact members 11 into engagement with said shaft around the entire bearing member.

In Fig. 8 a bearing is shown that has a base or pillow block portion 26 and a cap portion 27 that are secured together by machine screws 28 extending through ears 29 and screw-threaded into ears 30. In the form of the invention illustrated, the pillow block, or base member, and the cap member are provided with recesses therein, that have flat faces 31, the number thereof being nonessential. Molded in each of said recesses are the body members 32, which are made of similar material to the body portions 10 and 10', these, of course, conforming in shape to the shape of the recess provided in each of said cap and base members 26 and 27, to thus be fixed therein against rotation, the same being so molded that a slot, or gap, 33 is provided between each of said molded body portions 32 at their opposed faces.

Embedded in said body portions 32 are the glass rod-like members 11 previously described, these being arranged in an annular series, with their axial centers spaced at equal distances from the axial center of the bearing, and of course, the shaft 14, with which these engage. It will be obvious that these bearing members 11 can be adjusted to the shaft 14 by adjustment of the screws 28, the glass bearing members 11 being, of course, fixed in position and embedded in the members 32 in a similar manner to that previously described in connection with the other bearing members, and projecting beyond the substantially semi-cylindrical inner faces 34 of the bearing halves, in the same manner as do the bearing members 11 beyond the curved inner faces 13 of the body portions 10 and 10'.

In order to prevent any flexing of the rod-like members 11, due to any unevenness in the contour of the shaft, it is found desirable, in long bearings, such as that shown in Fig. 9, to provide a series of rows of rod-like glass members, that are arranged in axial alignment and with the end portions thereof spaced from each other, these being indicated by the numeral 11'' in Fig. 9 and being mounted in a body portion 10'', which is made of similar material to that of the body portions 10 and 10', previously described. The members 11'' are, preferably, molded in said body portion 10'', so that the members 11'' of adjacent rows are arranged in staggered relation, so that the members 11'' of one axial row will overlap the gaps between the members 11'' of the next adjacent row. The members 11'', of course, project inwardly beyond the curved inner face 35 of the member 10'', the gaps referred to being indicated by the numeral 36 and the material of the body portion 10'' forming fins, or ribs, 37 that extend between the ends of the members 11'' of each row, and beyond the ends of the endmost members 11'' of each row, but not as far inwardly as the innermost portions of said members 11''. The gaps 36 are thus provided and, of course, spaces, or recesses, 38 are provided between the circumferentially adjacent rows of cylindrical, or rod-like, elements 11''. Thus a series of inter-connected grooves are provided, extending between adjacent rows of said glass contact or bearing members 11'' and also between the ends of adjacent ones of said members in the same row. An annular metallic shell 19 is provided, surrounding the body portion 10''.

In all the forms of the invention described above, the glass members have convex bearing surfaces and are located on the inside of the bearing to contact with a rotating member within the same and all are arranged with their axes parallel to the axis of the shaft, or other rotating member, for which the bearing is provided. Instead of providing contact members on the inside of a bearing, these can be provided on the outside of a bearing so as to engage a member within which the member carrying the bearing rotates. Such an arrangement is shown in Figs. 5, 6 and 7, in which a shaft 39 is shown, upon which a tubular, or sleeve-like member, 40 is mounted, which may be fixed to said shaft, if desired, by means of a set screw 41.

Molded around said sleeve-like member 40 is the molded body portion 42, made of a plastic material, preferably, such as described in connection with the body portion 10 shown in Figs. 1 to 2, which body portion has a convex outer surface 43 and has molded therein so as to be inlaid in fixed position, the glass rod-like members 11, which are the same in every respect as the glass rod-like members previously described, and project beyond the outer convex surface 43 of the body portion 42, being mounted or embedded in the body portion so as to be held in fixed position therein, and being so nested in the material of the body portion as to be firmly supported thereby, so that all stresses thereon will be compression stresses only. The projecting portions 12' of the members 11 contact a ring-like metallic member 44, which may be mounted in any suitable socket member 45, and may be held in fixed position therein by means of a set screw 46, if desired. As the shaft 39 rotates, it will be obvious that the bearing member comprising the members 40, 42 and 11 will rotate therewith. It will also be evident that grooves that can receive lubricant are provided between the ring-like member 44 and the convex outer surface 43 of the body portion 42 between the rod-like glass bearing members 11, the same being, of course, arranged in an annular series around the axis of the bearing, with their axes all spaced the same distance from the axis of the bearing.

For extremely small shafts, it may be found difficult to make a bearing in the manner previously described, made up of the annular series of rod-like glass members. A bearing that is useful for such extremely small shafts is shown in Figs 10 and 11, in which the body portion 46 of a plastic, has embedded therein a tubular glass bearing member 47, the glass bearing member being molded within the body portion of the plastic material and being, preferably, provided with means to key the same therein to prevent rotation thereof, such as the flat faces 48. The material of the body portion 46, is, preferably, the same as that of the body portions 10, 10', 32, 10" and 42 and is made of such a character that it will be sufficiently resilient to absorb any shock that may be transmitted to the glass bearing member 47, and the glass bearing portion being made of a heat resistant glass of high tensile strength, and may be provided with grooves 49 for lubricant, the body portion 46 being, preferably, enclosed within an annular shell 50 of metal.

Instead of making the glass bearing member, such as shown in Figs. 10 and 11, of one piece, preferably, the same is made of a plurality of sections both longitudinally and transversely of the bearing, the sections being spaced from each other and being inlaid in the molded material 46. In such case the flat faces 48 can be dispensed with, as the glass bearing members 51 will be held against relative rotation due to the fact that the ends thereof are separated from each other to provide a gap 52, which provides a lubricant groove running lengthwise of the bearing, and the molded material 46 is molded around the members 51, so that the same are inlaid therein, and fin portions 53 are provided that do not project inwardly as far as the inner concavely curved surfaces 54 of the members 51, which space the members 51 from each other to provide the gap and hold the same against rotation. In a similar manner the inwardly projecting portions 55 of the molded body portion 46 on opposite sides of the members 51, between said members 51 and at the opposite ends of the bearing provide fins that prevent movement of the members 51 endwise of the bearing and provide a circumferentially extending lubricant groove 56 that intersects the grooves 52. It is, of course, to be understood that the members 51, are preferably, made of a heat resistant glass, similar to that previously described. The molded body portion 46 is, preferably, surrounded by a metallic sleeve-like member 50, such as previously described.

While sectional bearing members having concave bearing faces and convex bearing faces have been described, and while rod-like members have been described that have convex bearing surfaces, rod-like members can be provided that have flat bearing or planar bearing surfaces. One form of such bearing is shown in Figs. 14 and 15, and another form in Figs. 16 and 17, but it will be obvious that the rod-like members of the forms shown in Figs. 14 to 17 could be substituted for the rod-like members of a cylindrical character in any of the forms of bearing shown.

In Figs. 14 and 15 the molded body portion 110 has inlaid therein the glass rod-like members 111, which have projecting portions 112 that have flat of planar bearing surfaces 109, the projecting portions 112 extending beyond the inner concave surface 113 of the molded body portion 110 in a similar manner to that previously described for the convexly curved, or cylindrical, rod-like bearing members. The same are spaced in a similar manner to that previously described, to provide the lubricant grooves 116 and may engage any rotatable member, such as the shaft 114, the same being inlaid in the molded body portion 110 in a similar manner to that previously described. A metallic shell portion 119, preferably, surrounds the molded body portion 110 for the same reason as previously described, and this is mounted in a suitable bearing socket in any suitable mounting member 120. The material of the molded body portion 110 extends beyond the ends of the rod-like members 111 to prevent endwise movement thereof. It has been found particularly desirable to provide rod-like bearing members with flat faces 109, as these appear to have greater quietness than bearing members with convex bearing surfaces. In order to prevent any cutting action of the corners of the hard glass bearing rods 111, the corners are, preferably, rounded as indicated at 108 along the opposite longitudinal edges thereof on the exposed side of the rod-like members, and at 107 along the transverse exposed edges thereof.

Instead of making the rod-like members rectangular in cross section, as shown in Figs. 14 and 15, the same can be made with the side faces thereof extending at an oblique angle to each other, so that the rod-like members will be keyed in the molded body portion. Such an arrangement is shown in Figs. 16 and 17, in which the members 111' are made with flaring side walls so as to be dove-tailed in the body portion 110 when inlaid therein. In Figs. 16 and 17 the flat or planar bearing surfaces 109 are shown as engaging a sleeve 115 mounted on the shaft 114, instead of directly with the shaft. Otherwise the parts are the same as shown in Figs. 14 and 15 and bear the same reference numerals.

What we claim is:

1. A bearing comprising a body portion of a material having a lower molding temperature than the melting point of glass and a plurality of longitudinally and circumferentially spaced glass bearing members embedded in the material of said body portion in fixed position and projecting therefrom.

2. A bearing comprising an annular series of rod-like axially extending glass members molded in fixed position in a body portion of a material having greater elasticity and a lower molding temperature than the melting point of glass, and projecting radially beyond any part of said body portion on the side of said bearing that a relatively rotatable member is adapted to engage.

3. A bearing comprising an annular series of separate, spaced axially extending glass members inlaid in fixed position in a body of greater elasticity than glass and projecting radially therefrom, on the side of said bearing that a relatively rotatable member is adapted to engage, said glass members being each in supporting contact with the material of said body from end to end of said glass member.

4. A bearing comprising an annular body portion having a central opening, and an annular series of cylindrical glass bearing members embedded in said body portion and projecting into said opening.

5. A bearing comprising a body portion of a material having a lower molding temperature than the melting point of glass and a plurality of separate spaced glass bearing members embedded in the material of said body portion in fixed position and projecting therefrom, said bearing members being arranged in axially extending rows and annularly around said body portion.

6. A bearing comprising a body portion of a material having a lower molding temperature than the melting point of glass and a plurality of separate spaced glass bearing members embedded in the material of said body portion in fixed position and projecting therefrom, said bearing members being arranged in axially extending rows and annularly around said body portion, the bearing members of adjacent rows being staggered.

7. A bearing comprising an annular series of rod-like axially extending glass members embedded in fixed position in a body of greater elasticity than glass and projecting radially therefrom, said body portion being split to permit adjustment of said bearing.

8. A bearing comprising an annular series of rod-like axially extending glass members embedded in fixed position in a body of greater elasticity than glass and projecting radially therefrom, and a cylindrical metallic member contacting all said rod-like members.

9. A bearing comprising an annular series of separate, spaced axially extending glass members inlaid in fixed position in a body of greater elasticity than glass and projecting radially therefrom, said glass members having curved bearing surfaces.

10. A bearing comprising a body portion of a material having a lower molding temperature than the melting point of glass, and a glass bearing member seated in fixed position in the material of said body portion, said bearing member being shorter than said body portion and the material of said body portion extending around and enclosing the major portions of the ends of said glass bearing member, said glass bearing member projecting radially beyond said body portion in one direction and being in supporting contact with the material of said body portion throughout its length and said material of said body portion projecting radially beyond said bearing member in the opposite direction.

11. A bearing comprising an annular body portion having a central opening, and an annular series of spaced, rod-like glass bearing members embedded in said body portion and projecting into said opening.

12. A bearing comprising a body portion of a material having a lower molding temperature than the melting point of glass, having inner and outer curved faces, longitudinally extending circumferentially spaced glass bearing members embedded in the material of said body portion in fixed position and projection therefrom on one of said curved faces, and an annular metallic wall on the other curved face of said body portion.

13. A bearing comprising an annular body portion having inner and outer curved faces, said body portion being of greater elasticity than glass, an annular series of spaced, rod-like axially extending glass bearing members embedded in fixed position in said body portion and projecting radially beyond one of said curved faces, a cylindrical metallic member contacting all said rod-like members, and a cylindrical metallic member engaging the other of said curved faces of said body portion.

14. A bearing comprising an annular body portion having inner and outer curved faces, said body portion being of greater elasticity than glass, an annular series of spaced rod-like axially extending glass bearing members embedded in fixed position in said body portion and projecting radially inwardly from the inner curved face of said body portion, and a cylindrical metallic casing embracing the outer curved face of said body portion.

15. A bearing comprising an annular body portion having inner and outer curved faces, said body portion being of greater elasticity than glass, an annular series of spaced cylindrical axially extending glass bearing members embedded in fixed position in said body portion and projecting radially inwardly from the inner curved face of said body portion, and a cylindrical metallic casing embracing the outer curved face of said body portion.

16. A bearing comprising an annular body portion having inner and outer curved faces, said body portion being of greater elasticity than glass, an annular series of spaced cylindrical axially extending glass bearing members embedded in fixed position in said body portion and projecting radially beyond one of said curved faces, and a cylindrical metallic member engaging the other of said curved faces of said body portion.

17. A bearing comprising a body portion of a material having a lower molding temperature than the melting point of glass, having inner and outer curved faces, a plurality of separate spaced glass bearing members embedded in the material of said body portion in fixed position and projecting from one of the curved faces thereof, said bearing members being arranged in axially extending rows and annularly around said body portion, the bearing members of adjacent rows being staggered, and an annular metallic wall on the other curved face of said body portion.

THOMAS O. DAYWALT.
RALPH A. BRIANT.